United States Patent
Yu et al.

(10) Patent No.: US 12,235,180 B2
(45) Date of Patent: Feb. 25, 2025

(54) PHASE ALIGNMENT SYSTEM AND METHOD OF OSCILLATING MIRROR

(71) Applicants: BEIJING QIANHENGDE TECHNOLOGY CO., LTD, Beijing (CN); BEIJING LIQIAN HENGXIN TECHNOLOGY CO., LTD, Beijing (CN)

(72) Inventors: Hongxiang Yu, Beijing (CN); Kangheng Wang, Beijing (CN); Yijie Yang, Beijing (CN)

(73) Assignees: BEIJING QIANHENGDE TECHNOLOGY CO., LTD, Beijing (CN); BEIJING LIQIAN HENGXIN TECHNOLOGY CO., LTD, Beijing (CN)

( * ) Notice: Subject to any disclaimer, the term of this patent is extended or adjusted under 35 U.S.C. 154(b) by 842 days.

(21) Appl. No.: 17/436,681

(22) PCT Filed: Mar. 26, 2020

(86) PCT No.: PCT/CN2020/081421
§ 371 (c)(1),
(2) Date: Sep. 7, 2021

(87) PCT Pub. No.: WO2020/200039
PCT Pub. Date: Oct. 8, 2020

(65) Prior Publication Data
US 2022/0196517 A1    Jun. 23, 2022

(30) Foreign Application Priority Data
Mar. 29, 2019 (CN) .......................... 201910248730.6

(51) Int. Cl.
*G01M 11/02* (2006.01)
*G01M 11/00* (2006.01)

(52) U.S. Cl.
CPC ...... *G01M 11/0207* (2013.01); *G01M 11/005* (2013.01)

(58) Field of Classification Search
CPC ............ G01M 11/0207; G01M 11/005; G02B 26/105
See application file for complete search history.

(56) References Cited

U.S. PATENT DOCUMENTS

| | | | |
|---|---|---|---|
| 8,752,969 B1 * | 6/2014 | Kane | G01C 11/025 359/872 |
| 2007/0041069 A1 * | 2/2007 | Oettinger | G02B 26/101 359/200.7 |

* cited by examiner

*Primary Examiner* — Tarifur R Chowdhury
*Assistant Examiner* — Amanda Merlino
(74) *Attorney, Agent, or Firm* — Scully, Scott, Murphy & Presser, P.C.

(57) ABSTRACT

The present invention discloses a phase alignment system and method of oscillating mirror. The present invention utilizes the reciprocating scanning symmetry feature of the simple harmonic oscillation motion of the oscillating mirror to construct scanning pattern data with complementary pixel brightness and darkness. When the phase difference parameter applied by the scan controller is consistent with the actual phase of simple harmonic oscillation of the oscillating mirror, the scanning pattern data with complementary pixel brightness and darkness and the reciprocating motion of the oscillating mirror are accurately matched, and a perfect stitched continuous scanning line with uniform brightness is obtained on the projection plane, thereby achieving the effect of being clearly distinguishable, easy to detect, and convenient for alignment operation.

10 Claims, 6 Drawing Sheets

PHASE ALIGNMENT SYSTEM AND METHOD OF OSCILLATING MIRROR

TECHNICAL FIELD

The invention relates to the electrical control systems and methods, and specifically to a phase alignment system and method of an oscillating mirror.

BACKGROUND OF THE INVENTION

With the advancement of ultra-precision manufacturing technology, miniature oscillating mirrors made by miniaturization process are constantly emerging in recent years. Among them, there are micro-galvanometer devices that are excited by pulsed voltage and driven by a periodic electrostatic field, and there are micro galvanometer devices that are driven by pulsed current and driven by a periodic magnetic field. Their oscillation frequency can reach more than 20 kilohertz, and the angular amplitude can reach more than ±25°. These devices have been used to construct a variety of optical scanning or optical imaging devices, such as automotive HUD displays, lidars, structured light three-dimensional scanners, and so on. Affected by the fact that the torsion beam structure made of silicon/quartz material is commonly used in the micro-oscillating mirror and the material characteristics of the silicon/quartz material, the electrical excitation pulse signal applied to the micro-galvanometer driving mechanism has a phase difference between its phase and the simple harmonic oscillation generated by the micro-galvanometer. Moreover, the phase difference is affected by factors such as the manufacturing process of the micro-galvanometer and the material inconsistency, and there is a certain degree of dispersion.

On the other hand, in order to achieve precise scanning control of the reflected beam of the micro-galvanometer, it must rely on an accurate galvanometer deflection angle signal. However, different from the angle sensor solution adopted by the large-size galvanometer motor, the micro-galvanometer is limited by the size, and it is difficult to set a high-resolution angle sensor. The currently commonly used method is based on the simple harmonic oscillation motion characteristics of the micro-galvanometer. According to the phase of the electrical excitation signal and the phase difference parameter between it and the simple harmonic oscillation, the real-time deflection angle of the galvanometer is calculated, so as to be used for beam switching and brightness control. This method requires that each micro-galvanometer device must have a one-to-one corresponding accurate phase difference parameter, which has become one of the main difficulties in the batch application of micro-galvanometer.

In the absence of an accurate phase difference parameter, existing engineering solutions generally indirectly calculate the phase difference between the electrical excitation signal and the simple harmonic oscillation by detecting the deviation of the edge position of the pattern projected by the micro-galvanometer or by directly adjusting the phase difference parameter of the projection controller according to the edge change rule of the projected pattern until the edge position is the same. The phase alignment effect of the above solution not only depends on the detection accuracy of the edge position of the image, but also requires the micro-mirror and the projection plane to be accurately parallel and center-aligned. Therefore, the operation is difficult and the actual alignment effect is poor. At present, in the technical field of electrically excited oscillating micro-mirrors, there is still a lack of a phase alignment method with simple solutions and high precision.

SUMMARY

In view of the deficiencies of the prior art, the present invention provides a technical system and method for phase alignment of an oscillating mirror that has simple solutions, high precision, and can realize electrical excitation.

The technical solutions of the present invention are described as follows:

A phase alignment system of an oscillating mirror, comprising: a laser light source, oscillating mirror and scan controller, wherein the laser light source emits a laser beam located in the normal plane drawn from the deflection axis of the oscillating mirror, wherein the laser beam is illuminated on the center position of the oscillating mirror at a fixed incident angle, and illuminated on the projection plane after being reflected, wherein the projection plane is parallel to the plane of the oscillating mirror in static state, and wherein the scan controller is electrically connected to the oscillating mirror and the laser light source;

during scanning, the scan controller sends out an electrical excitation signal according to the inherent frequency of the oscillating mirror and applies it to an oscillating mirror driving mechanism through a signal line, the oscillating mirror driving mechanism drives the oscillating mirror to deflect in a clockwise or counterclockwise direction, the scan controller outputs a beam switch signal to the laser light source, and the laser beam emitted by the laser light source is reflected by the oscillating mirror to form a continuous scan line segment on the projection plane;

during alignment, constructing a first scan line and a second scan line; matching, by the scan controller, the first scan line to the clockwise scan stage of the oscillating mirror, and matching the second scan line to the counterclockwise scan stage of the oscillating mirror, making scan sequentially; detecting the relative position of the scanned first scan line and the second scan line, and adjusting the phase difference parameter of the scan controller according to the relative position of the first scan line and the second scan line.

Preferably, the oscillating mirror driving mechanism includes an electrostatic electrode or an electromagnetic coil.

Preferably, the continuous scan line segment is a line pattern whose length can be equally divided and quantified into 2n pixels.

Preferably, the laser beam scans the 1st to the 2nth pixels on the projection plane in sequence when the oscillating mirror starts to deflect clockwise from the limit position. The laser beam scans the 2nth to the 1st pixels on the projection plane in sequence when the oscillating mirror is deflected counterclockwise from the limit position.

Preferably, when the oscillating mirror is deflected clockwise or counterclockwise, the scan controller determines the pixel scanned by the laser beam on the projection plane according to the real-time angle of the oscillating mirror, and outputs the laser brightness data corresponding to the pixel to the laser light source, thereby obtaining the desired pixel pattern on the projection plane.

Preferably, the first scan line and the second scan line are selected from at least one or a combination of line patterns and simple geometric patterns.

Preferably, the first scan line is a line pattern in which the (m+1)th to nth pixels are ON and the remaining pixels are OFF; the second scan line is a line pattern in which the (2n−m)th to (n+1)th pixels are ON and the remaining pixels are OFF, wherein n is a positive integer, m is zero or a positive integer, m is less than n, and (n+1) is less than (2n−m).

Preferably, the relative positions of the first scan line and the second scan line include three states: partial overlap, mutual separation, and end-to-end connection.

Preferably, adjusting the phase difference parameter of the scan controller in the leading direction when the relative position of the first scan line and the second scan line is partial overlap; adjusting the phase difference parameter of the scan controller in the lagging direction when the relative position of the first scan line and the second scan line is mutual separation; and the phase alignment of the oscillating mirror is completed when the relative position of the first scan line and the second scan line is adjusted to the end-to-end state.

The present invention also provides a phase alignment method of oscillating mirror, the method comprising the following steps:

S01. constructing a first scan line and a second scan line;

S02. deflecting the oscillating mirror in a clockwise direction, and sequentially scanning, by the laser beam, the pixels on the first scan line on the projection plane; deflecting the oscillating mirror in a counterclockwise direction, and sequentially scanning, by the laser beam, the pixels on the second scan line on the projection plane;

S03. detecting the relative position of the scanned first scan line and the second scan line;

S04. adjusting the phase difference parameter of the scan controller according to the detected relative position of the first scan line and the second scan line; particularly, adjusting the phase difference parameter of the scan controller in the leading direction when the relative position of the first scan line and the second scan line is partially overlap, and adjusting the phase difference parameter of the scan controller in the lagging direction when the relative positions of the first scan line and the second scan line is mutual separation;

S05. the phase alignment of the oscillating mirror is completed when the relative positions of the first scan line and the second scan line are adjusted to the end-to-end state.

The beneficial effect of the present invention is that the phase alignment method of electric excitation oscillating mirror of the present invention does not require additional optical or electrical components, and does not require special projection planes or image edge detection devices. It only needs to simply adjust the laser light source drive mode, and then through two specially constructed scanning patterns, and through a simple recognition method, it can detect the state of partial overlap, mutual separation, and end-to-end connection, and then adjust the phase difference parameter value applied by the scan controller to complete the phase alignment of the oscillating mirror.

The laser light source of the present invention has strong beam direction and good focusing, and the scanning line segment obtained by the beam on the projection screen has a clear boundary; when the two projected line segments are separated, the dark part in the middle is obvious, when the two projected line segments partially overlap, the brightness of the overlapped part is prominent, therefore, it is convenient to detect the relative position of the first scan line and the second scan line, which is beneficial to realize the fine adjustment of the phase difference parameter of the scan controller, and finally realize the High-accuracy phase alignment of the oscillating mirror.

The phase alignment method of the oscillating mirror of the present invention has a simple solution, high technical feasibility, and high phase alignment accuracy, and is easy to popularize and apply in an oscillating mirror device.

Figure 1:
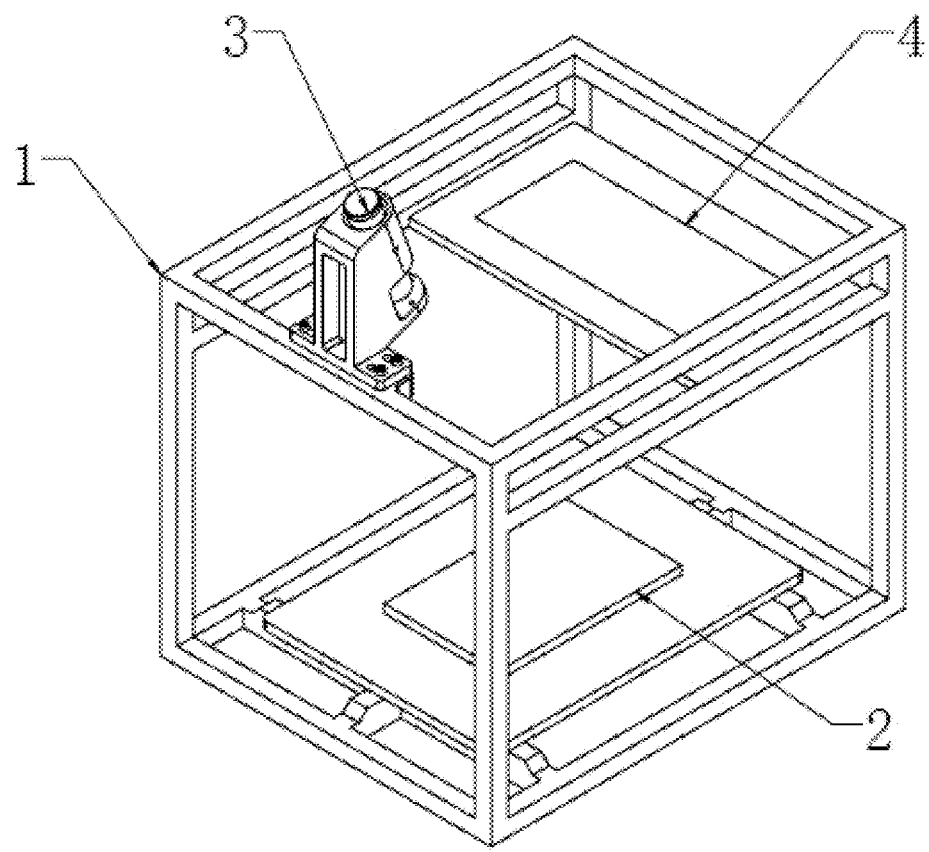
FIG. 1 is a schematic diagram illustrating the overall structure of a phase alignment system of an oscillating mirror according to the present invention.

Reference number: rigid support 1, oscillating mirror 2, laser light source 3, projection plane 4, scan controller 5, laser beam 11, normal plane 12, reflected beam 13, scan line segment pattern 14, additive substrate 8, first scan line 31, second scan line 32.

DETAILED DESCRIPTION OF THE EMBODIMENTS

The embodiments of the present invention will be described in detail below with reference to the accompanying drawings.

Figure 2:
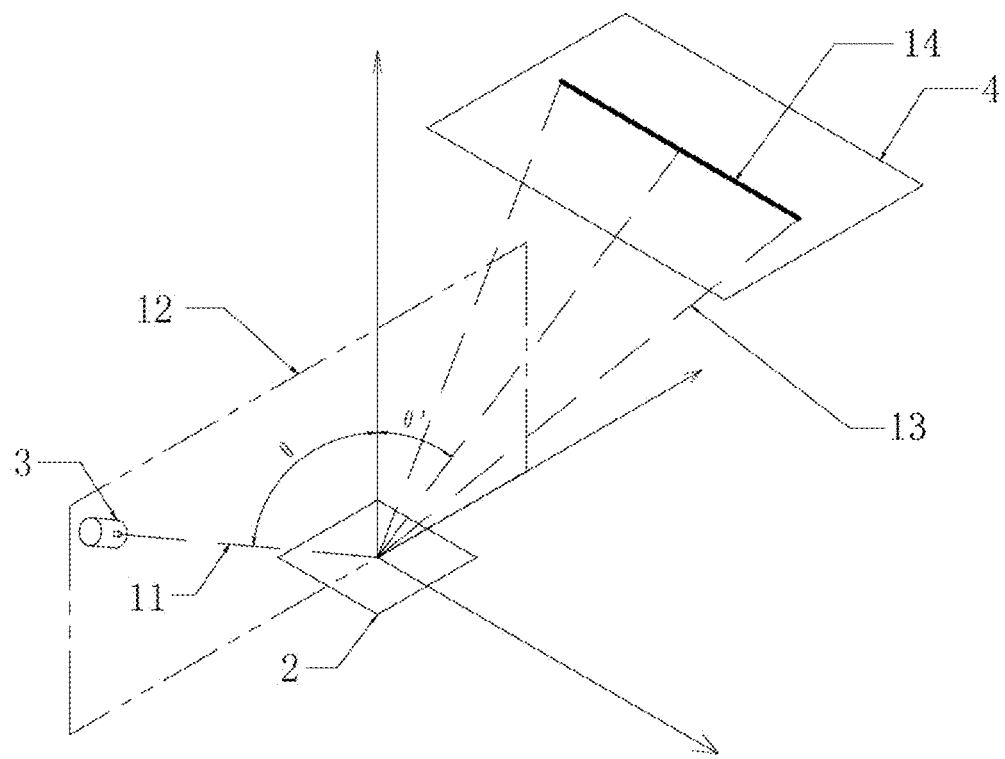
FIG. 2 is a schematic diagram illustrating the light path of the phase alignment system of an oscillating mirror according to the present invention.

A phase alignment system of oscillating mirror, comprising: laser light source, oscillating mirror and scan controller. In one or more embodiments, as shown in FIG. 1, an oscillating mirror 2 is provided on the base of the rigid support 1, a laser light source 3 is provided on the rigid support 1, the laser beam emitted by the laser light source 3 is directed to the center position of the micro oscillating mirror 2, and illuminated on the projection plane 4 after being reflected. The projection plane 4 is parallel to oscillating mirror 2 in static state. The schematic diagram of the optical path is shown in FIG. 2. The laser beam 11 emitted by the laser light source 3 is located in the normal plane 12 drawn from the torsion axis of the oscillating mirror 2, and the reflected beam 13 reflected by the oscillating mirror 2 is directed toward the projection plane 4.

During scanning, the scan controller sends out an electrical excitation signal according to the inherent frequency of the oscillating mirror and applies it to an oscillating mirror driving mechanism through a signal line. Preferably, the oscillating mirror driving mechanism includes an electrostatic electrode or an electromagnetic coil.

In one or more embodiments, as shown in FIG. 2, the oscillating mirror 2 can be deflected clockwise or counterclockwise under the drive of the driving mechanism; meantime, the scan controller outputs a beam switch signal to the laser light source 3, and the reflected beam 13 of the laser beam 11 reflected by the oscillating mirror 2 scans on the projection plane 4 to form a scan line pattern 14.

Figure 3A:
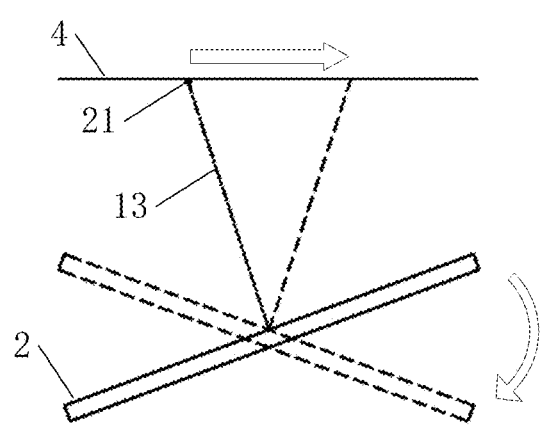
FIGS. 3A and 3B are schematic diagrams illustrating the scan manners of the phase alignment system of an oscillating mirror according to the present invention.
Figure 3B:
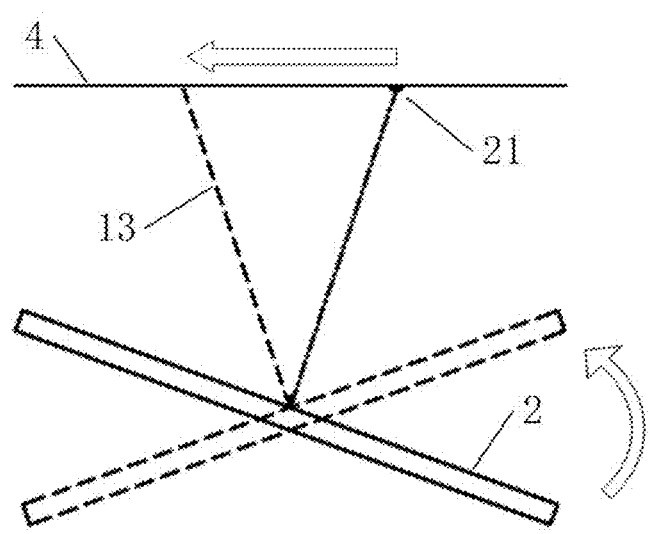
Figure 4:
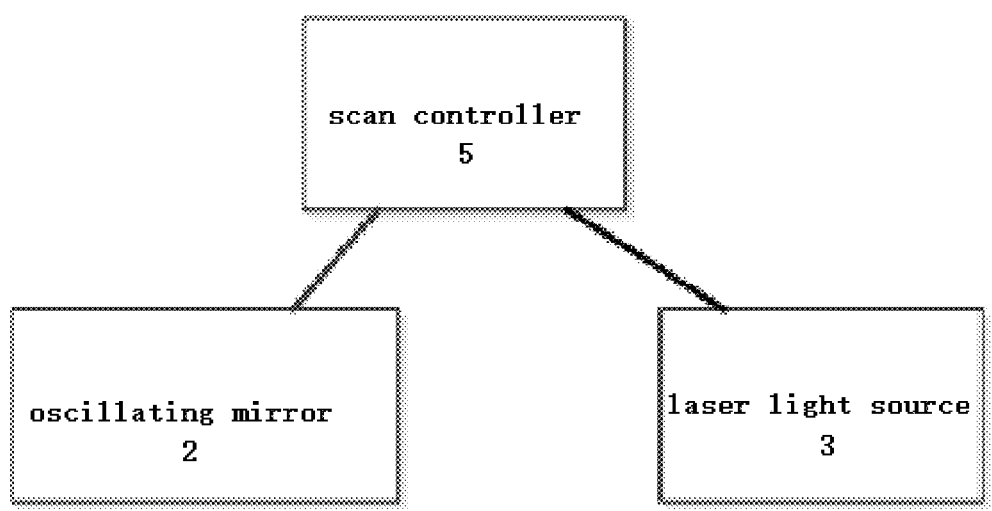
FIG. 4 is a diagram illustrating the control signal connection of the phase alignment system of an oscillating mirror according to the present invention.

The specific scanning method is shown on the left side of FIG. 3. When the oscillating mirror 2 is in the counterclockwise limit position, the scanning point 21 of the reflected beam 13 in the projection plane 4 is located on the leftmost side, and then the oscillating mirror 2 scans in the clockwise direction and the scanning point 21 moves from left to right. As shown on the right side of FIG. 3, when the oscillating mirror 2 is in the clockwise limit position, the scanning point 21 of the reflected beam 13 in the projection plane 4 is located on the rightmost side, and then the micro oscillating mirror 2 scans counterclockwise, and the scan point 21 moves from right to left. When the micro oscillating mirror 2 performs continuous simple harmonic oscillation, the clockwise scanning and the counterclockwise scanning are performed alternately, the scanning point 21 moves from left to right on the projection plane 4, also alternating with the scanning movement from right to left.

In one or more embodiments, the continuous scan line segment 14 is a line pattern whose length can be equally divided and quantified into 2n pixels. When the oscillating mirror starts to deflect clockwise from the limit position, the reflected beam 13 scans the 1st to the 2nth pixels on the projection plane in sequence. The reflected beam 13 scans the 2nth to the 1st pixels on the projection plane in sequence when the oscillating mirror starts to deflect counterclockwise from the limit position.

In the above embodiment, when the oscillating mirror starts to deflect clockwise or counterclockwise, the scan controller 5 can also determine the phase of the electrical excitation signal and the applied phase difference parameter, calculate the instantaneous deflection angle of the oscillating mirror 2, and calculate the pixel point where the spot instantaneously scanned by reflected beam 13 is located according to the geometric parameters of the optical path shown in FIG. 2, and then obtain the brightness value of the pixel by indexing from the scanning pattern data, and transmit the laser brightness data corresponding to the pixel to the laser light source 3 to control the output of the laser beam 11 with corresponding brightness, to reflect to the projection plane 4, so as to obtain the desired pixel pattern.

During alignment, constructing a first scan line and a second scan line; matching, by the scan controller, the first scan line to the clockwise scan stage of the oscillating mirror and matching the second scan line to the counterclockwise scan stage of the oscillating mirror, making scan sequentially.

The first scan line and the second scan line are selected from line patterns, and may also be selected from at least one of simple geometric patterns such as rectangles and triangles, or a combination of the foregoing patterns, as long as the pattern can be easily detected by light and dark brightness.

In one or more embodiments, the first scan line is a line pattern in which the (m+1)th to nth pixels are ON and the remaining pixels are OFF; the second scan line is a line pattern in which the (2n−m)th to (n+1)th pixels are ON and the remaining pixels are OFF, wherein n is a positive integer, m is zero or a positive integer, m is less than n, and (n+1) is less than (2n−m).

In one embodiment, the first scan line is a line pattern in which the 1st to nth pixels are ON and the remaining pixels are OFF, and the second scan line is a line pattern in which the 2n to (n+1)th pixels are ON and the remaining pixels are OFF. That is, n is a positive integer and m is 0. In the clockwise scanning stage of the oscillating mirror, scanning the 1st to nth pixels (that is, the first scan line) in sequence; in the counterclockwise scanning stage of the oscillating mirror, scanning the 2n to (n+1)th pixels (that is, the second scan line) in sequence.

Preferably, the first scan line is a line pattern in which the n/2+1 to nth pixels are ON and the remaining pixels are OFF; the second scan line is a line pattern where the 3n/2 to n+1th pixels are ON and the remaining pixels are OFF Line pattern. That is, n is a positive even number, m=n/2. In the clockwise scanning phase of the oscillating mirror, scanning the n/2+1 to nth pixels (that is, the first scan line) in sequence; in the counterclockwise scanning phase of the oscillating mirror, scanning the 3n/2 to (n+1)th pixels (that is, the second scan line) in sequence.

During the continuous alternating scanning process, detecting the relative position of the scanned first scan line and the second scan line, and adjusting the phase difference parameter of the scan controller. Wherein, the relative positions of the first scan line and the second scan line include three states: partial overlap, mutual separation, and end-to-end connection.

Figure 5A:
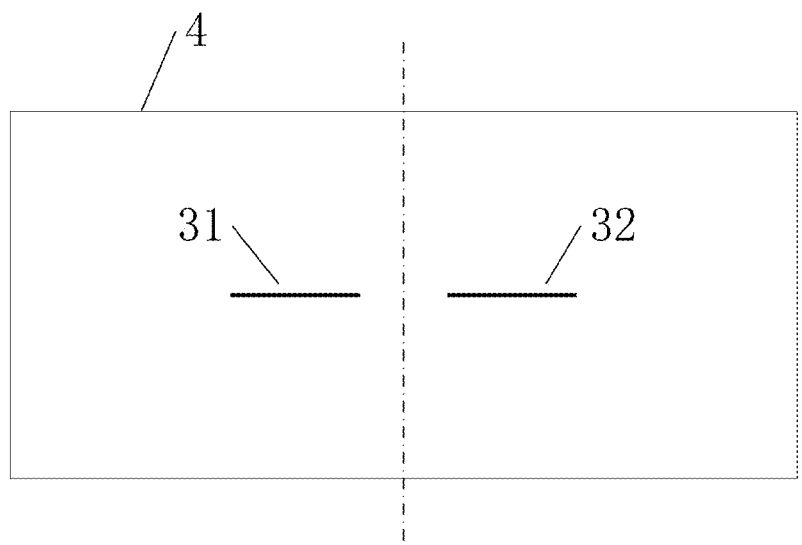
FIGS. 5A-5C are diagrams illustrating the relative positions of the first scan line and the second scan line during alignment according to embodiments of the present invention.
Figure 5B:
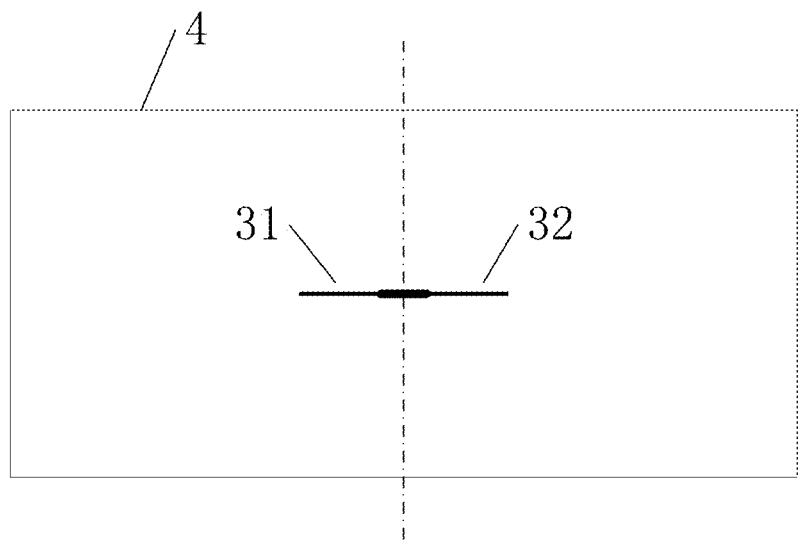
Figure 5C:
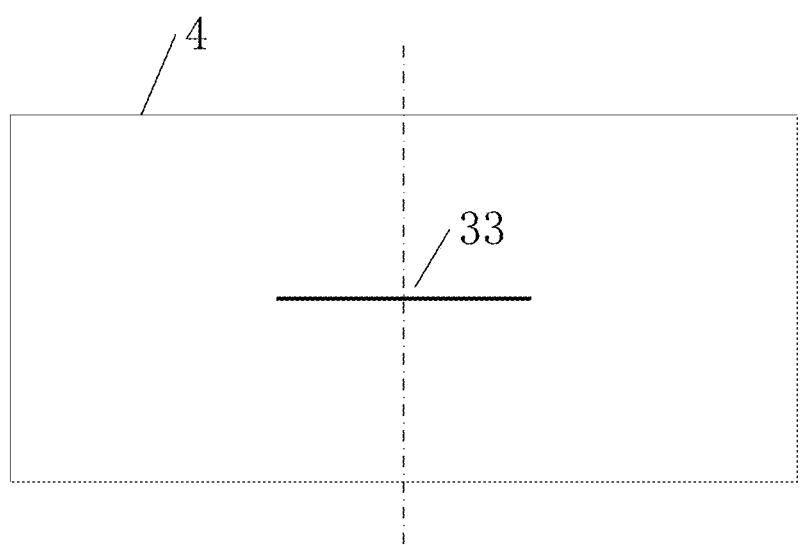
Figure 6:
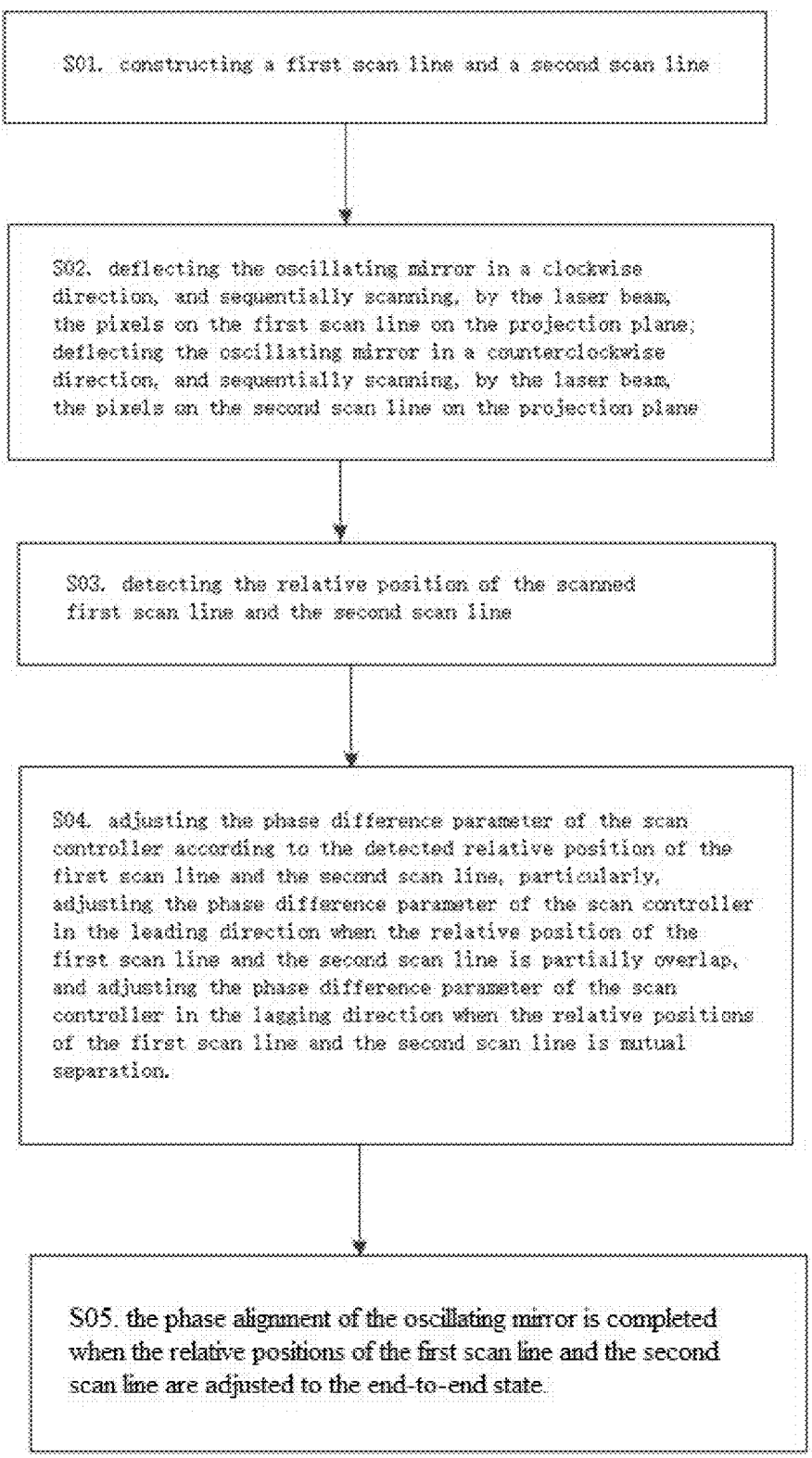
FIG. 6 shows the implementation steps of a phase alignment method of an oscillating mirror of the present invention.

As shown in FIGS. 5A to 5C, when the phase difference parameter applied by the scan controller is leading the actual phase of the oscillating mirror, the oscillating mirror scans the resulting first scan line 31 clockwise and deviates from the center line of the projection plane 4 to the left, and the oscillating mirror scans the resulting second scan line 32 counterclockwise and deviates from the center line of the projection plane 4 to the right. The first scan line 31 and the second scan line 32 are separated from each other, as shown in FIG. 5A. Conversely, when the phase difference parameter applied by the scan controller lags behind the actual phase of the oscillating mirror, the oscillating mirror scans the resulting first scan line 31 clockwise, with the right end thereof passing through the center line of the projection plane 4 to the right, and the oscillating mirror scans the resulting second scan line 32 counterclockwise, with the left end thereof passing through the center line of the projection plane 4 to the left, and the right end of the first scan line 31 partially overlaps with the left end of the second scan line 32, as shown in FIG. 5B. When and only if the phase difference parameter applied by the scan controller is consistent with the actual phase of the oscillating mirror, the right end of the first scan line 31 and the left end of the second scan line 32 are just connected end to end, as shown in FIG. 5C, so as to be spliced into a continuous projection line 33 with uniform brightness.

Therefore, when adjusting the phase difference parameter of the scan controller according to the relative position of the first scan line and the second scan line, when the relative position of the first scan line and the second scan line are partially overlapped, adjusting phase difference parameter of the scan controller to the leading direction; and when the relative positions of the first scan line and the second scan line are separated from each other, adjusting the phase difference parameter of the scan controller in the lagging direction.

The technical solution of the present invention also includes a phase alignment method of oscillating mirror, and the method comprises the following steps:

S01. constructing a first scan line and a second scan line;

S02. deflecting the oscillating mirror in a clockwise direction, and sequentially scanning, by the laser beam, the pixels on the first scan line on the projection plane; deflecting the oscillating mirror in a counterclockwise direction, and sequentially scanning, by the laser beam, the pixels on the second scan line on the projection plane;

S03. Detecting the relative position of the scanned first scan line and the second scan line;

S04. adjusting the phase difference parameter of the scan controller according to the detected relative position of the first scan line and the second scan line. Specifically, when the relative position of the first scan line and the second scan line is partially overlap, adjusting the phase difference parameter of the scan controller in the leading direction; when the relative positions of the first scan line and the second scan line is mutual separation, adjusting the phase difference parameter of the scan controller in the lagging direction;

S05. when the relative positions of the first scan line and the second scan line are adjusted to the end-to-end state, the phase alignment of the oscillating mirror is completed.

In one or more embodiments, the first scan line and the second scan line in the step 01 are selected from line patterns, and may also be selected from at least one of simple geometric patterns such as rectangles and triangles, or a combination of the foregoing patterns, as long as the pattern can be easily detected by light and dark brightness.

In one or more embodiments, the first scan line is a line pattern in which the (m+1)th to nth pixels are ON and the remaining pixels are OFF; the second scan line is a line pattern in which the (2n−m)th to (n+1)th pixels are ON and the remaining pixels are OFF, wherein n is a positive integer, m is zero or a positive integer, m is less than n, and (n+1) is less than (2n−m).

In one embodiment, the first scan line is a line pattern in which the 1st to nth pixels are ON and the remaining pixels are OFF, and the second scan line is a line pattern in which the 2n to (n+1)th pixels are ON and the remaining pixels are OFF. That is, n is a positive integer and m is 0. In the clockwise scanning stage of the oscillating mirror, scanning the 1st to nth pixels (that is, the first scan line) in sequence; in the counterclockwise scanning stage of the oscillating mirror, scanning the 2n to (n+1)th pixels (that is, the second scan line) in sequence.

Preferably, the first scan line is a line pattern in which the n/2+1 to nth pixels are ON and the remaining pixels are OFF; the second scan line is a line pattern where the 3n/2 to n+1th pixels are ON and the remaining pixels are OFF Line pattern. That is, n is a positive even number, m=n/2. In the clockwise scanning phase of the oscillating mirror, scanning the n/2+1 to nth pixels (that is, the first scan line) in sequence; in the counterclockwise scanning phase of the oscillating mirror, scanning the 3n/2 to (n+1)th pixels (that is, the second scan line) in sequence.

In one or more embodiments, steps S03 to S05 are specifically shown in FIGS. 5A to 5C. If it is detected that the first scan line 31 and the second scan line 32 are in the state of mutual separation, as shown in FIG. 5A, then adjusting the phase difference parameter applied by the scan controller in the lagging direction until the two bright line segments are just connected end-to-end, as shown in FIG. 5C. That is, the alignment of the phase difference parameter applied by the scan controller relative to the actual phase of the oscillating mirror is completed. If it is detected that the first scan line 31 and the second scan line 32 are in a partially overlapping state, as shown in FIG. 5B, then adjusting the phase difference parameter applied by the scan controller in the leading direction until the two bright line segments are completely separated, and then adjusting the phase difference parameter of the scan controller in the lagging direction until the two bright line segments are just connected end-to-end, as shown in FIG. 5C, that is, the alignment of the phase difference parameter applied by the scan controller relative to the actual phase of the oscillating mirror is completed.

The present invention utilizes the reciprocating scanning symmetry feature of the simple harmonic oscillation motion of the oscillating mirror to construct scanning pattern data with complementary pixel brightness. Only when the phase difference parameter applied by the scan controller is consistent with the actual phase of the simple harmonic oscillation of the oscillating mirror, the pattern data with complementary pixel brightness and darkness can accurately match the reciprocating motion of the oscillating mirror, and a perfect stitched continuous scanning line with uniform brightness is obtained on the projection plane, thereby achieving the effect of being clearly distinguishable and easy to detect. Furthermore, a continuous and uniformly-bright scanning line after perfect stitching is obtained on the projection plane, so as to achieve the effect of being clearly distinguishable and easy to detect. The splicing continuity of the scanning pattern on the projection plane of the present invention has no relation with the installation parallelism and distance of the projection plane relative to the oscillating mirror, and the position and attitude deviation of the projection plane does not affect the phase alignment accuracy of the oscillating mirror.

The method of the present invention for judging the splicing state of the reciprocating scanning pattern can also be directly observed and judged by human eyes in addition to using optical sensitive devices, such as digital cameras, etc., as long as the oscillating mirror's reciprocating oscillation motion is symmetrical, and the scanning frequency exceeds the minimum frequency required by the human eye's visual residual.

The above are only preferred embodiments of the present invention, and not any formal limits to the technical solutions of the present invention. Any simple modification, form change and modification to the above embodiments according to the technical essence of the present invention shall fall into the protection scope of the present invention.

What is claimed is:

1. A phase alignment system of an oscillating mirror, comprising:
a laser light source, an oscillating mirror and a scan controller,
wherein the laser light source emits a laser beam located in a normal plane drawn from a deflection axis of the oscillating mirror, wherein the laser beam is illuminated on the center position of the oscillating mirror at a fixed incident angle, and illuminated on a projection plane after being reflected, wherein the projection plane is parallel to a plane of the oscillating mirror in static state, and wherein the scan controller is electrically connected to the oscillating mirror and the laser light source;
during scanning, the scan controller sends out an electrical excitation signal according to the inherent frequency of the oscillating mirror and applies it to an oscillating mirror driving mechanism through a signal line, the oscillating mirror driving mechanism drives the oscillating mirror to deflect in a clockwise or counterclockwise direction, the scan controller outputs a beam switch signal to the laser light source, and the laser beam emitted by the laser light source is reflected by the oscillating mirror to form a continuous scan line segment on the projection plane; and during alignment, constructing a first scan line and a second scan line;

matching, by the scan controller, the first scan line to a clockwise scan stage of the oscillating mirror and matching the second scan line to a counterclockwise scan stage of the oscillating mirror, scanning sequentially pixels on the first and second scan line on the projection plane; detecting a relative position of the first scan line and the second scan line and adjusting a phase difference parameter of the scan controller according to the relative position of the first scan line and the second scan line.

2. The phase alignment system of an oscillating mirror according to claim 1, wherein the oscillating mirror driving mechanism includes an electrostatic electrode or an electromagnetic coil.

3. The phase alignment system of an oscillating mirror according to claim 1, wherein the continuous scan line segment is a line pattern whose length is equally divided and quantified into 2n pixels, wherein n is a positive integer.

4. The phase alignment system of an oscillating mirror according to claim 3, wherein the laser beam scans the 1st to the 2nth pixels on the projection plane in sequence when the oscillating mirror starts to deflect clockwise from a limit position; wherein the laser beam scans the 2nth to the 1st pixels on the projection plane in sequence when the oscillating mirror is deflected counterclockwise from the limit position.

5. The phase alignment system of an oscillating mirror according to claim 1, wherein when the oscillating mirror is deflected clockwise or counterclockwise, the scan controller determines the pixel scanned by the laser beam on the projection plane according to a real-time angle of the oscillating mirror, and outputs a laser brightness data corresponding to the pixel to the laser light source, thereby obtaining a desired pixel pattern on the projection plane.

6. The phase alignment system of an oscillating mirror according to claim 1, wherein the first scan line and the second scan line are selected from at least one or a combination of line patterns and simple geometric patterns.

7. The phase alignment system of an oscillating mirror according to claim 1, wherein the first scan line is a line pattern in which the (m+1)th to nth pixels are ON and the remaining pixels are OFF; the second scan line is a line pattern in which the (2n−m)th to (n+1)th pixels are ON and the remaining pixels are OFF, wherein n is a positive integer, m is zero or a positive integer, m is less than n, and (n+1) is less than (2n−m).

8. The phase alignment system of an oscillating mirror according to claim 1, wherein the relative positions of the first scan line and the second scan line include three states: partial overlap, mutual separation, and end-to-end connection.

9. The phase alignment system of an oscillating mirror according to claim 1, wherein, adjusting the phase difference parameter of the scan controller in a leading direction when the relative position of the first scan line and the second scan line is partial overlap; adjusting the phase difference parameter of the scan controller in a lagging direction when the relative position of the first scan line and the second scan line is mutual separation; and the phase alignment of the oscillating mirror is completed when the relative position of the first scan line and the second scan line is adjusted to an end-to-end state.

10. A phase alignment method of oscillating mirror, the method comprising the following steps:
   SO1. constructing a first scan line and a second scan line;
   S02. deflecting the oscillating mirror in a clockwise direction, and sequentially scanning, by a laser beam, pixels on the first scan line on a projection plane; deflecting the oscillating mirror in a counterclockwise direction, and sequentially scanning, by the laser beam, pixels on the second scan line on the projection plane;
   S03. detecting a relative position of the scanned first scan line and the second scan line;
   S04. adjusting a phase difference parameter of a scan controller according to the detected relative position of the first scan line and the second scan line, adjusting the phase difference parameter of the scan controller in a leading direction when the relative position of the first scan line and the second scan line is partially overlap, and adjusting the phase difference parameter of the scan controller in a lagging direction when the relative positions of the first scan line and the second scan line is mutual separation; and
   S05. the phase alignment of the oscillating mirror is completed when the relative positions of the first scan line and the second scan line are adjusted to an end-to-end state.

* * * * *